United States Patent
Rahman et al.

(10) Patent No.: US 10,360,093 B2
(45) Date of Patent: Jul. 23, 2019

(54) DETECTING ANOMALOUS STATES OF MACHINES

(71) Applicant: FAIR ISAAC CORPORATION, San Jose, CA (US)

(72) Inventors: Shafi Ur Rahman, Bangalore (IN); Ashish Gupta, Bangalore (IN)

(73) Assignee: Fair Isaac Corporation, Roseville, MN (US)

( * ) Notice: Subject to any disclaimer, the term of this patent is extended or adjusted under 35 U.S.C. 154(b) by 67 days.

(21) Appl. No.: 14/944,928

(22) Filed: Nov. 18, 2015

(65) Prior Publication Data

US 2017/0139760 A1 May 18, 2017

(51) Int. Cl.
| | |
|---|---|
| *G06F 11/00* | (2006.01) |
| *G06F 11/07* | (2006.01) |
| *G06F 11/30* | (2006.01) |
| *G06F 11/34* | (2006.01) |
| *G06F 16/28* | (2019.01) |

(52) U.S. Cl.
CPC .......... *G06F 11/079* (2013.01); *G06F 11/008* (2013.01); *G06F 11/0709* (2013.01); *G06F 11/0751* (2013.01); *G06F 11/0772* (2013.01); *G06F 11/3065* (2013.01); *G06F 11/3447* (2013.01); *G06F 11/3495* (2013.01); *G06F 16/285* (2019.01)

(58) Field of Classification Search
CPC ............ G06F 11/0751; G06F 11/0772; G06F 11/079; G06F 11/3447; G06F 11/3495; G06F 11/3452
See application file for complete search history.

(56) References Cited

U.S. PATENT DOCUMENTS

| | | | | |
|---|---|---|---|---|
| 5,465,321 A * | 11/1995 | Smyth | ................. | G06F 11/2257 376/216 |
| 6,868,325 B2 * | 3/2005 | Menon | ..................... | F02C 9/00 701/100 |
| 7,302,451 B2 * | 11/2007 | Radhakrishnan | .......................... | G06F 17/30787 |
| 7,561,991 B2 * | 7/2009 | Matsunaga | .......... | G06K 9/6297 703/2 |
| 7,930,746 B1 | 4/2011 | Sheleheda et al. | | |
| 8,155,820 B2 * | 4/2012 | Eklund | ................. | G06F 11/008 701/29.2 |
| 8,185,348 B2 * | 5/2012 | Shan | ................... | G06F 11/0751 702/179 |

(Continued)

*Primary Examiner* — Elmira Mehrmanesh
(74) *Attorney, Agent, or Firm* — Mintz Levin Cohn Ferris Glovsky and Popeo, P.C.

(57) ABSTRACT

The state of a system is determined in which data sets are generated that include a plurality of data instances representing states of one or more components of a computer system. The data instances generated by one or more data set sources that are configured to output a data instance in response to a trigger associated with the one or more components. The data instances are normalized by the application of one or more rules. The data instances from individual data set sources are separately collated to generate groups of time-specific collated data instances. State types may be assigned to each of the collated data instance groups. Distributions of state-types across the groups may be determined and a list of infrequent state-types may be generated based on the determined distributions of state-types across the groups.

19 Claims, 9 Drawing Sheets

(56) References Cited

U.S. PATENT DOCUMENTS

| | | | | |
|---|---|---|---|---|
| 8,418,249 B1* | 4/2013 | Nucci | | G06F 21/552 706/20 |
| 8,635,174 B2* | 1/2014 | Kobayashi | | G06N 3/126 706/13 |
| 8,751,414 B2* | 6/2014 | Datta | | G06F 11/0751 706/11 |
| 8,775,358 B2* | 7/2014 | Bonawitz | | G06N 7/005 706/52 |
| 8,909,562 B2* | 12/2014 | Bhatnagar | | G06N 7/005 706/12 |
| 9,544,321 B2* | 1/2017 | Baikalov | | H04L 63/1425 |
| 2003/0117279 A1* | 6/2003 | Ueno | | G06K 9/00335 340/523 |
| 2004/0181527 A1 | 9/2004 | Burdick et al. | | |
| 2005/0111535 A1 | 5/2005 | Saey | | |
| 2007/0294223 A1 | 12/2007 | Gabrilovich et al. | | |
| 2008/0046430 A1 | 2/2008 | Niekamp | | |
| 2008/0154555 A1* | 6/2008 | Qu | | G06K 9/32 703/2 |
| 2010/0290601 A1 | 11/2010 | Chen et al. | | |
| 2011/0055122 A1* | 3/2011 | Andreoli | | G06F 11/0751 706/12 |
| 2012/0093424 A1 | 4/2012 | Denney et al. | | |
| 2012/0123981 A1* | 5/2012 | Graves | | G06F 17/30339 706/13 |
| 2013/0080641 A1* | 3/2013 | Lui | | H04L 67/10 709/226 |
| 2013/0152158 A1 | 6/2013 | Yoshihama | | |
| 2013/0305093 A1* | 11/2013 | Jayachandran | | G06F 11/0754 714/37 |
| 2014/0108314 A1* | 4/2014 | Chen | | G06F 17/18 706/20 |
| 2014/0180980 A1* | 6/2014 | Hido | | G06N 99/005 706/12 |
| 2014/0215053 A1* | 7/2014 | Marwah | | H04L 12/28 709/224 |
| 2014/0310714 A1* | 10/2014 | Chan | | G06F 17/30598 718/102 |
| 2015/0113649 A1* | 4/2015 | Angelov | | G06F 11/0751 726/23 |
| 2015/0304346 A1* | 10/2015 | Kim | | H04L 63/1408 726/23 |
| 2016/0364464 A1 | 12/2016 | Gupta et al. | | |

* cited by examiner

300

```
0  100 thread1 open the fridge
1  110 thread1 put elephant in the fridge
2  130 thread1 close the fridge
3  110 thread2 open the fridge
4  120 thread2 remove elephant from the fridge
5  140 thread2 put giraffe in the fridge
6  160 thread2 close the fridge
7  150 thread3 tachyon goes in the fridge
8  155 thread3 open the fridge
9  165 thread3 close the fridge
```

Pre-processing

```
0  @TIMESTAMP@ thread1 open the fridge
1  @TIMESTAMP@ thread1 put elephant in the fridge
   ...                    edit distance = 3
```

```
S1  ... thread1 open the fridge
S1  ... thread1 close the fridge
S1  ... thread2 open the fridge
S1  ... thread2 close the fridge
S1  ... thread3 open the fridge
S1  ... thread3 close the fridge
S2  ... thread1 put elephant in the fridge
S2  ... thread2 put giraffe in the fridge
S3  ... thread2 remove elephant from the fridge
S4  ... thread3 tachyon goes in the fridge
```

DETECTING ANOMALOUS STATES OF MACHINES

TECHNICAL FIELD

The subject matter described herein relates to analyzing machine logs and modifying the machine log data to determine likely future outcomes and component failure of systems.

BACKGROUND

Systems can comprise states and as systems operate they can be considered transitioning through a series of states. Such systems include operational IT systems, utility systems, sensor systems and other systems comprising one or more components. Operational IT systems, for example, produce state information of the system's components through machine-generated plain text logs. These logs contain valuable information useful for system monitoring, debugging and improvement. These machine logs can provide information that can be used to determine a state of a machine. Utility grids and sensor systems can include components that continuously or intermittently provide information associated with their current operational status i.e. states. This information can be combined. The combined information associated with individual or clusters of components can provide information about the state of the entire machine.

In the case of machine logs, they are often generated by explicit instructions in source code of system components encoded by the developer in a piece of software governing the working of that component. Hence each log-line can be tracked to a PRINT or equivalent statement in underlying source code, which is a reflection of flow of control and order of execution of code. This information may be labeled as a system 'state'.

SUMMARY

In one aspect, a computer-implemented method is provided for implementation by one or more data processors forming part of at least one computing device to facilitate the detection and avoidance of undesirable system states of a system. The computer-implemented method can include monitoring states of the system. The system can comprise a plurality of components. The states of the system can have state types and can be translated into data instance groups.

The data instance groups can be received. Distributions of the state types within the data instance groups can be determined. Determining the distributions of the state types within the data instance groups can facilitate the identification of infrequent state types of a system or a component of a system.

Rare states and rare sequences of state can be identified. Rare sequences can include sequences of data instance groups that occur prior to the occurrence of a state having an infrequent state type. A notification of the occurrence of a rare sequence on the system can be provided. The notification can be provided to a system administrator. The notification can be provided to one or more automated systems configured to take action(s) in response to receipt of the notification.

One or more of the following features may optionally be provided or performed. In some variations, the data instance groups may be represented as feature vectors of strings, numerical values, or the like. The data instance groups can include attribute information associated with the state of the machine.

In some variations, translating the identified sequences into feature vectors can comprise generating machine-state transition features associated with the identified sequences for inclusion in the feature vectors. Feature scores can be assigned to the machine-state transition features. The feature scores of the same feature class can be combined.

A model can be generated. The model can represent the frequency of occurrence of the identified sequences. A model can show the frequency of occurrence of the combined feature scores for one or more feature classes. A model can be graphically illustrated.

The feature vectors can, in some cases, include the starting state of the identified sequence. Individual feature vectors can include the proportion of some states or state sub-sequences within a number of states of the identified sequence. The feature vectors can include an indication of the time for the transition between a first state and a second state of the sequence. The feature vectors can include an indication of the time for the transition between consecutive states of one or more components of a system, the system, or the like. The feature vectors can include an indication of the number of data instance groups intermediate to transition from a first state to a second state. In some variations the first state and the second state can be consecutive states. In other variations, the first state and the second state can be non-consecutive states.

In some variations, the data instance groups can be generated through a process that includes receiving data sets that include a plurality of data instances representing states of one or more components of a system. The data instances can be generated by one or more separate data set sources that are configured to output a data instance in response to a trigger associated with the one or more components and having associated time information. The process can include normalizing the data instances of the data sets. The data instances can be normalized by applying one or more rules to the data instances. Normalizing the data instances of the data sets can comprise determining a relationship between observed states and unobserved states of the system. The process can include separately collating the data instances of the data sets from individual data set sources across individual time elements. Collating the data instances in this manner can generate groups of time-element-specific collated data instances.

The data instance groups can include data instances representative of machine-log-lines. The data sets can include machine logs and the data instances can include machine-log-lines.

In another aspect, a system is described that is capable of detecting anomalous states of the system. The system can include at least one programmable processor. The system can comprise memory storing instructions which, when executed by the at least one programmable processor, can perform one or more operations. The implemented operations can include any of the operations described herein. The operations can include monitoring states of a machine comprising a plurality of components. The states of the machine can have state types and can be translated into data instance groups. Data instance groups can be received and distributions of state types within the data instance groups can be determined to identify infrequent state types. Rare sequences can be identified. Rare sequences can include sequences of data instance groups that occur prior to the occurrence of a state having an infrequent state type. A notification of the occurrence of a rare sequence on the machine can be generated.

State information produced by, or from, individual components of a machine can be referred to as data instances. A single data instance can represent state information obtained about a component, or group of components, that is produced at any one time. In some instances these data instances need to be normalized such that all data instances have similar characteristic. The data instances can be normalized by applying one or more rules to the data instances. The rules applied to the data instances to normalize the data instances may include abstracting common parameters out of the data instances. Such common parameters may include parameters that do not contribute to an understanding of the internal state of the one or more components, an interaction with one or more other components, and/or other events associated with the data instances. Examples of common parameters can include an entity identifier, a date and timestamp, and other common parameters. The rules applied to the data instances to normalize the data instances may include abstracting special characters out of the data instances. Data instances themselves may generate rules using an algorithm which can improve parameter abstraction process and make it context independent.

The data instances of the data sets from individual data set sources can be collated across individual time elements to generate groups of time-element-specific collated data instances. Time elements may be any selected unit of time. For example, the time element may be minute, hour, day, week or other time periods. A collection of time-element-specific data instances can represent the state of part of, or the whole of, a system. For example, the same underlying state can be represented by multiple, and possibly differently appearing, data instances. In some usage, the state of 'Normal' operation may have certain range of values of vibration of machines for sensor related data instances, and in other usage, the state of 'Disk failure' may have range of values of temperature of a moving part.

Having clusters of similar data instances can result in individual clusters of data instances representing same underlying states of a system, such as a computer system, utility grid and/or sensor system. A time sequence of individual clusters of data instances may represent the transition between states of a system over time, providing valuable information as to the system over time.

State-types can be assigned to each of the groups of collated data instances and/or clusters. This can facilitate labeling of data instance groups that represent system, or component group, state sequences.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

In another aspect a computer program product incorporating one or more of the features described herein is provided.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A is an illustration of example log lines being processed to identify states represented by the log lines, according to one or more elements of the current subject matter;

DETAILED DESCRIPTION

The present disclosure is directed toward analyzing data instance groups that represent states of a component of a machine and/or a machine for sequences that result in anomalous machine states. Anomalous machine states can be indicative of machine failure. When sequences that result in anomalous machine states are identified, those sequences can be looked for during the operation of the components and/or machine. Notifications can be provided and/or remedial measures can be taken to avoid any undesirable anomalous machine states before they cause failure of the machine or part thereof.

Anomalous machine states need to be identified. To identify anomalous machine states, general machine states need to be identified. The machine states can be identified by clustering together log lines having one or more similar parameters. Particular log lines can be generated when the control flow of the underlying machine reaches a particular state of execution. The particular state of execution can be an event. The event can cause the generation of an output. The output can be provided as a log line. The log line can include information indicating that the monitored machine is operating as expected. The log line can indicate that an action or event has occurred. The action or event can be an expected action or event, such as would occur during normal operation of the machine, or it can be an unexpected action or event, such as would occur outside of the normal operating parameters of the monitored machine. The action or event can include an indication that an exception, associated with the machine, has been reached.

Figure 1:
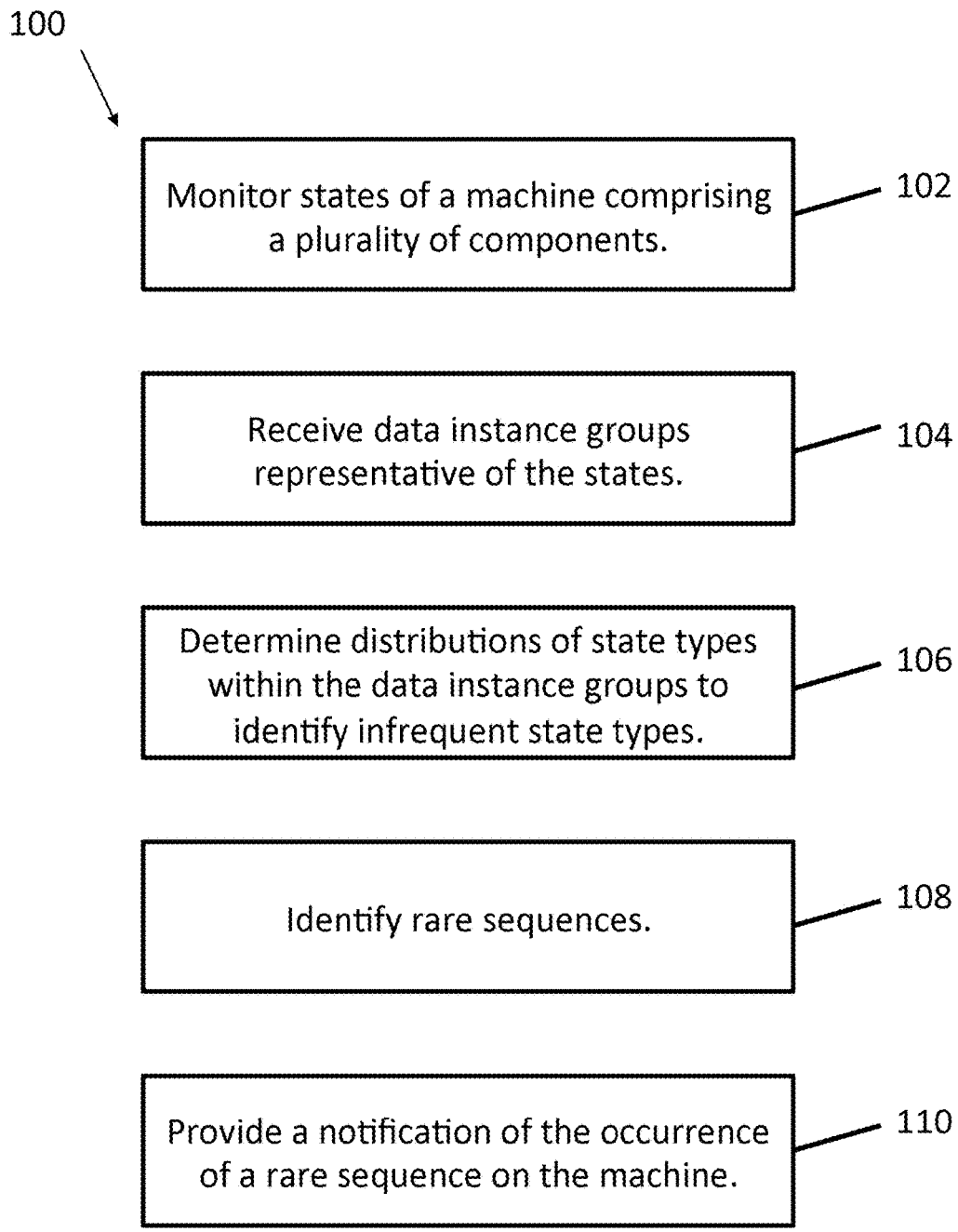
FIG. 1 is a process flow diagram illustrating aspects of a method having one or more features consistent with implementations of the current subject matter.

FIG. 1 is a process flow diagram 100 illustrating aspects of a method having one or more features consistent with implementations of the current subject matter. At 102 the states of a machine can be monitored. The machine can include a plurality of components. A machine can be a complex system. Examples of a machine include a software application or an app, an operating system, a cluster of servers, a network, an electricity grid monitoring system such as SCADA, or any other machine. Monitoring can be achieved through one or more events associated with the machine and/or components triggering an output. The output can be log data written to a log associated with an individual component, cluster of components, or the machine. As used herein, monitoring of the machine can refer to monitoring of the machine itself, monitoring of a component of the machine, monitoring a cluster of components of a machine, monitoring a cluster of machines, and/or monitoring other aspects associated with the machine.

In the context of sensor data, a given set of readings can collectively indicate a state of a system. The given set of readings at a particular time, or over a particular time interval, can indicate a state of a system at the particular time or over the time interval. Log lines or sensor observations can represent an underlying state of the component or the system. As such individual log lines (and by corollary the individual sensor data observations) represent the observed states. The observed states can themselves represent underlying unobserved states. In some variations, there can be a 1:1 correspondence between the observed and the unobserved states. In such variations, the observed states and the unobserved states can be virtually interchangeable.

A log and/or sensor data can include logs, messages, signals and/or other data construct. The output of the sensor can also be referred to as logs. The logs can be structured, partially unstructured or fully unstructured. The present disclosure includes predicting future state of the machine, including failure or anomalous state. The present disclosure relates to machine-generated log data as well as sensor-generated data. Where disclosure is directed to either machine-generated log data or sensor-generated data, that disclosure is equally applicable to the other.

The states of the system or its components, individually or collectively can be identified. The states may be identified by clustering together the log lines. Various methods of reducing the computational burden of generating such a large distance matrix are described herein, resulting in a computationally efficient way of clustering together log lines.

A list of underlying states may be generated by the presently disclosed system. The list of underlying states may be determined from all possible underlying states of each component of a system. The list of underlying states may be determined based on the individual states of the system and/or its components represented by each log-line or sensor data point. Log lines can be clustered based on one or more shared parameters. In some variations, each of the log lines may be labeled with one or more of the underlying states to generate a sequence of state transitions where the log lines are clustered in time based order. The state transitions representing component state transitions and/or system state transitions.

Individual log lines or sensor data information can be referred to as a data instance. The system that causes the generation of the data instance can be a data instance source. The data instance source can include the aforementioned machine, component, system, sensor, distributed system, and/or other data instance source. The data instances can be clustered into data instance groups. The data instance groups can be clustered based on the state(s) that they represent.

Figure 2:
FIG. 2 is an illustration of an example of a data instance being normalized in accordance with one or more features consistent with implementations of the current subject matter.

The data instance groups can be normalized. FIG. 2 is an illustration 200 of one example of the normalization of a data instance. In the special case of an IT system, the data instances can be normalized by passing the datasets through a series of filters. To normalize the data instances common parameters associated with the data may have been parsed out of the data sets. Such common parameters can include, for example, timestamps, IP addresses associated with system components, the duration of any events associated with the components, and other common parameters. The common parameters can be parsed out through the use of multiple different operations. An example of one such set of operations is Regular Expression. Regular Expression-based find and replace may be used to remove common parameters that appear commonly throughout the data sets of data instances.

Multi-parameter data instances may be transformed into single-parameter data instances to be included in the data instance groups. In the example where the data instances are log-lines, multi-parameter data instances may be multi-line log-lines. The multi-line log lines may be transformed into single-line log lines. Common data between the multiple parameters of a multi-parameter data instance may be removed. The remaining data of the multi-parameter data instance may be combined to create a single-parameter data instance containing items of information from each parameter.

The computational complexity of normalizing data instances can be high. Various improvements have been applied to the normalizing and the clustering computations to make the process more computationally efficient. The result of this process is a list of underlying states of the machine and a mapping of each data instance to one of the identified states of the machine.

State labels for each of the data instance groups can be generated. For each data instance group, the distance of each data instance from every other data instance can be obtained. In some implementations, the distance of each data instance from every other data instance will have been previously determined. In other instances, the distance of each data instance from every other data instance within a cluster must be determined. The data instance with the smallest distance from all other data instances is chosen as the labeling data instance (reference instance) for the cluster in which it resides. As such, individual clusters are given individual system or component state labels.

At 104, data instance groups that are representative of the states can be received. The data instance groups can be received by the one or more data processors. The data instances within the data instance groups may be generated by one or more separate data set sources that are configured to output a data instance in response to a trigger associated with the one or more components. The data instances may have associated time information. The associated time information may include a time at which the data instance was generated by the data set sources. The data instances within the data instance groups can be mapped to particular states of the machine. Consequently, the state of the machine, and/or component of the machine, can be readily determined, at a particular time or interval based on the data instance associated with that time or interval for that machine/component.

United States application Ser. No. 14/736,093 filed Jun. 10, 2015, which is incorporated herein by reference in its entirety, provides for the identification of underlying hidden states of a system without the use of any specialized state-determinative source code, documentation or expert input, and is applicable for both small and large volume of data instances.

At 106, distributions of state types within the data instance groups can be determined. Infrequent state types can be identified based on the determined distribution of state types. At 108, sequences of data instance groups that occur prior to the occurrence of an infrequent, or rare, state type can be identified.

The sequences of data instances can have associated sequence identification labels. The sequence identification labels can include a session ID, thread ID, or instance ID. Sequences of data instances can include discrete, relatively short, sequences of data instances. Sequences of data instances can include continuous, relatively long, sequences of data instances. In some variations, the system can include a continuously running operating system that has a single session, and therefore a single session ID.

Individual data instances representative of an individual state of a machine can include attributes additional to the label associated with the data instance. Such additional information can include, for example, an indication of a corresponding sequence identification label, a time-stamp associated with occurrence of that state, and/or other information.

Various approaches are contemplated for identifying anomalous states or groups of states of the machine through the data instance groups. These approaches include, but or not limited to, numerical clustering, numerical outlier determination, clustering of sequences as strings, and multi-order Markov chain application to the state transitions.

A numerical clustering can use hierarchical clustering of data instances, k-means clustering of data instances, and/or other clustering and segmentation approaches. Numerical outlier approach can be performed using multi-modal distribution based on Kernel Density Estimation, or using PCA and re-projection to identify observations with high re-projection errors. The numerical outlier may also be determined based on numeric feature vectors generated from state sequences.

At 108, the identification of rare sequences can include translating the sequence(s) into a feature vector(s). From the computed numeric feature vector(s) the outlier can be detected using Numerical outlier based approaches. In one of the approaches, the numerical outlier can be determined by treating each feature of the feature vector independently and applying univariate outlier detection. Kernel Density Estimation based outlier detection can support multi-modal distribution of univariate distributions. While Kernel Density Estimation is described herein any segmentation or clustering approach can be used to segment and/or cluster data instances into more manageable data sets.

Figures 3B, 3C:
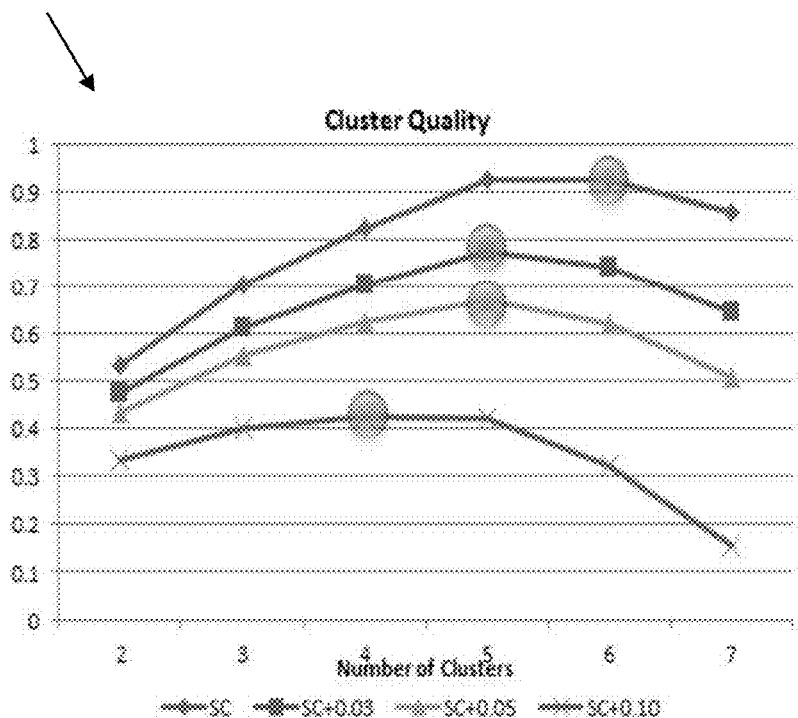
FIG. 3B illustrates a graph of an example of an equation for providing a quality of clusters as a function of the number of clusters, having one or more elements consistent with the current subject matter.
FIG. 3C is an illustration of the data instances having been clustered into data instance groups and given a state label, in accordance with one or more elements of the current subject matter.

FIG. 3A is an illustration 300 of example log lines, or data instances, being processed to identify states represented by the log lines. The quality of a clustering outcome may be measured by any number of suitable methods. This can provide a confidence level on the identified state of the system and/or components of the system. FIG. 3B illustrates a graph 302 which is an example of an objective function equation to show the quality of clusters as a function of the number of clusters. FIG. 3C is an illustration 304 of the data instances having been clustered into data instance groups and given a state label. The state labels can be used to identify the states of a system and/or groups of components.

Figure 4:
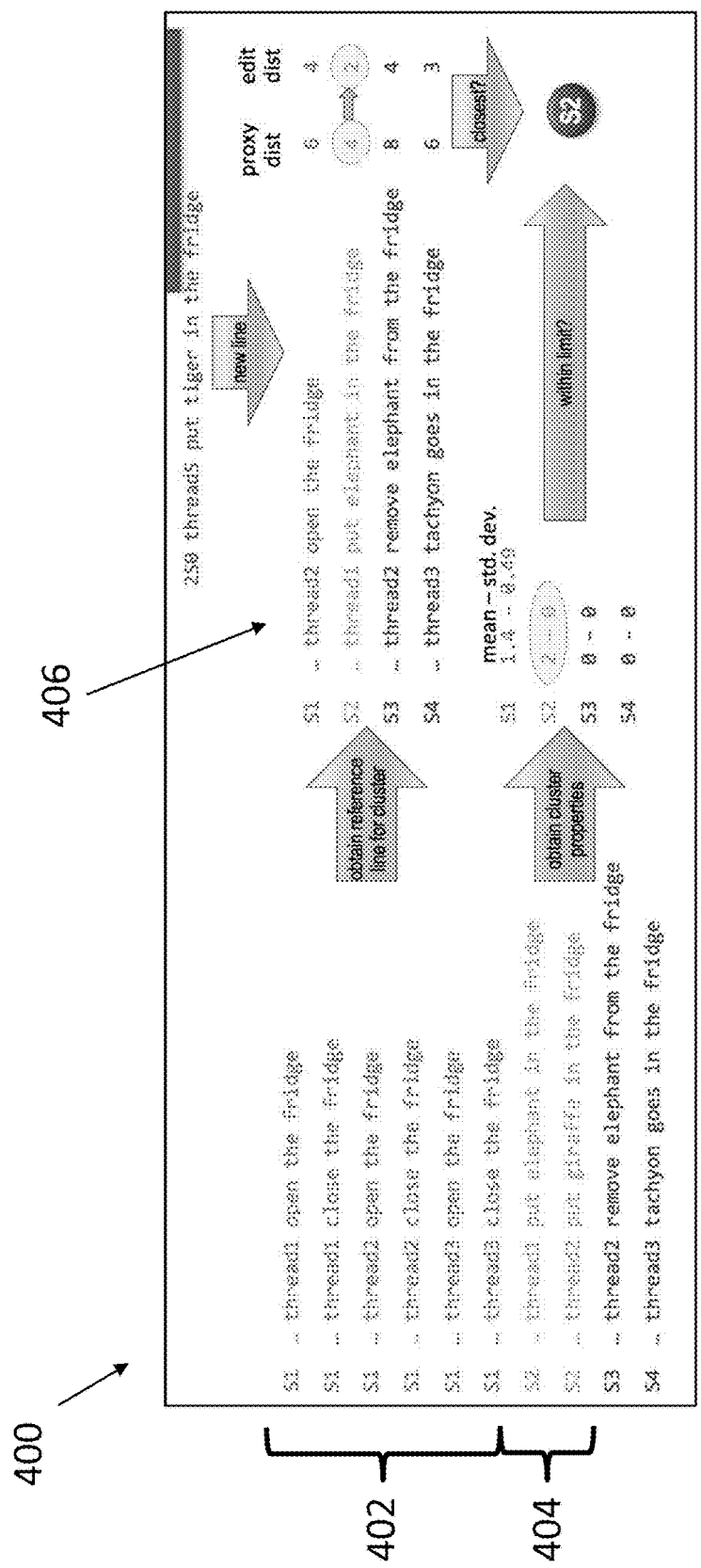
FIG. 4 is an illustration of a data instances being identified to represent each of the data instance clusters to form compressed represented as illustrated in FIG. 5, in accordance with one or more elements of the current subject matter.

A reference data instance can be identified to represent each of the data instance clusters. FIG. 4 is an illustration 400 of a data instance being identified to represent each of the data instance clusters from FIG. 3B. For each cluster of data instances 402, 404, a representative data instance 406 can be identified. Properties of each cluster of data instances 402, 404 can be identified. This facilitates determining the properties of each state of a system and/or group of components of the system.

Figure 5:
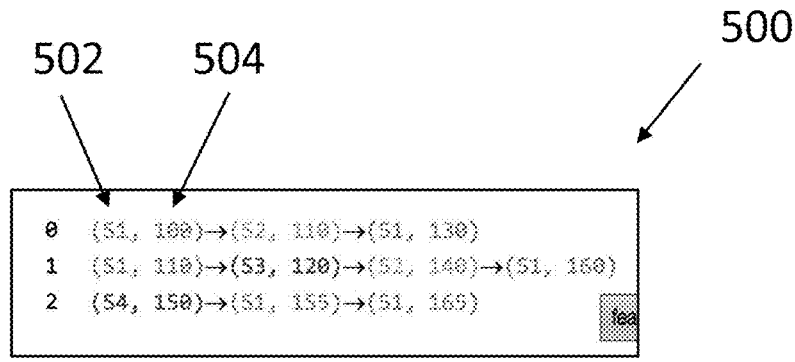
FIG. 5 is an illustration of representations of sequences of data instances, having one or more elements consistent with the current subject matter.

FIG. 5 is an illustration 500 of representations of sequences of data instances. Each element of the sequence includes a data instance cluster identifier 502 (FIG. 3C), and a data instance identifier 504 (FIG. 3A).

Figure 6:
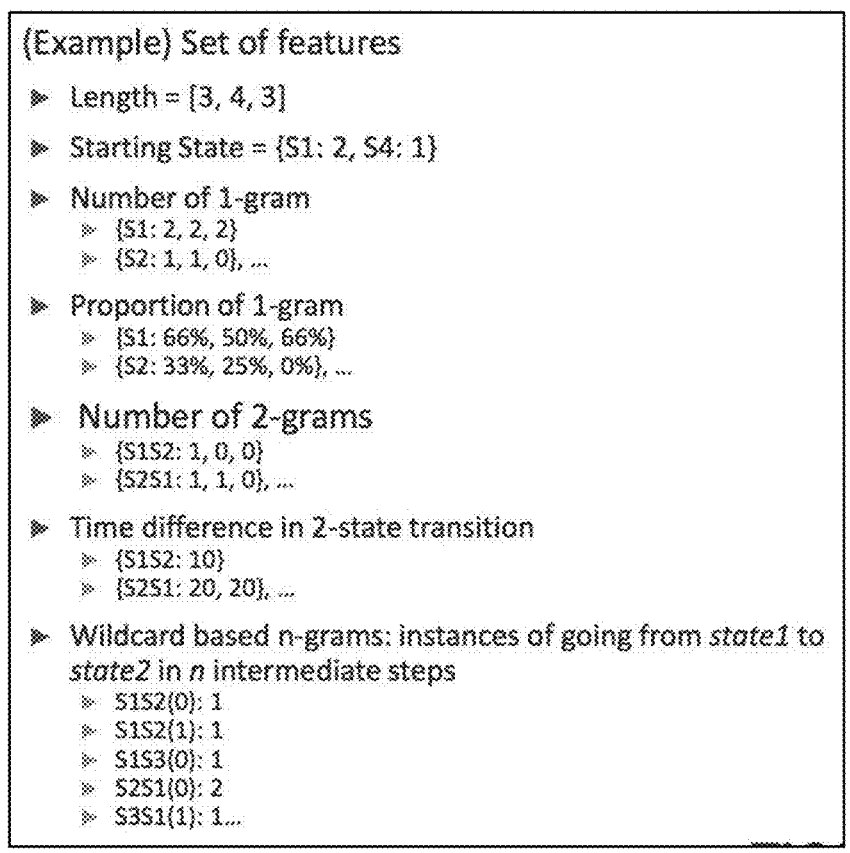
FIG. 6 is an illustration of an example feature vector set for data instance groups, having one or more elements consistent with the current subject matter.
Figure 7:
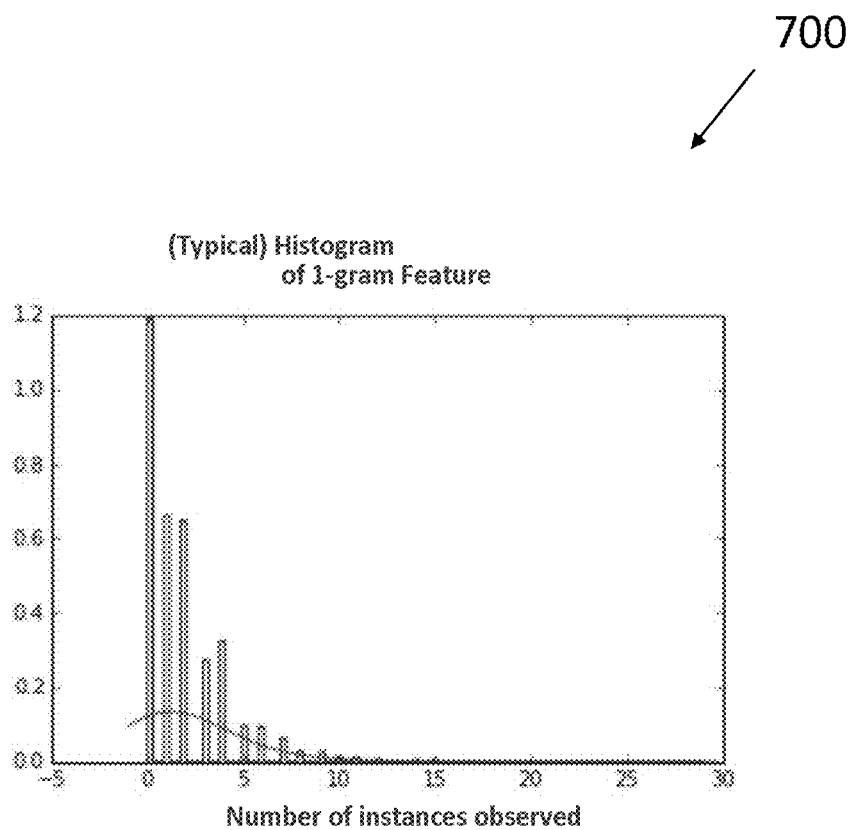
FIG. 7 is an illustration of a histogram showing the instances of the n-gram feature set, having one or more elements consistent with the current subject matter.

FIG. 6 is an illustration 600 of an example feature vector set for data instance groups. The numerical feature vectors can be generated from the state sequences. Features vectors could contain n-grams of states. In some variations, feature vectors may involve wild-card intermediate states. In other variations, feature vectors may be free from wild-card intermediate states Feature vectors can also include additional attributes. Such additional attributes can include time-stamp attributes, time difference attributes, and/or other attributes. FIG. 7 is an illustration 700 of an example histogram showing the distribution of one of the of the n-gram feature set. Kernel Density Estimation of the data is overlaid on the histogram.

As a simplistic illustrative example, two groups of data instances could be represented as [1] "a-b-c" and [2] "a-c-b-a." The two data instance groups can be represented as state sequences. The starting state of an identified sequence can be one type of feature in the feature vectors. For example, the starting state for data instance groups [1] and [2] is "a". Types of features can include, for example, the proportion of a state or a sub-sequence of states against the length of the whole identified sequence. For example, the proportional share of the state "a" in data instance group [1] is 1/3, and the proportional share of state "a" in data instance group [2] is 1/2. Other types of features can include the transition time between any two consecutive, or non-consecutive, states, for example, between the first and second state, the second and third state, the second and fourth state and the like. In the example of data instance groups [1] and [2], the transition time from "a" to "b" can be a feature, the transition time from "b" to "c" can be a feature, the transition time from "c" to "a" can be a feature, and the like. Other feature types can include the number of intermediate states between two states. In the example of data instance groups [1] and [2], the number of intermediate states between "a" and "c" can be a feature.

Figure 8:
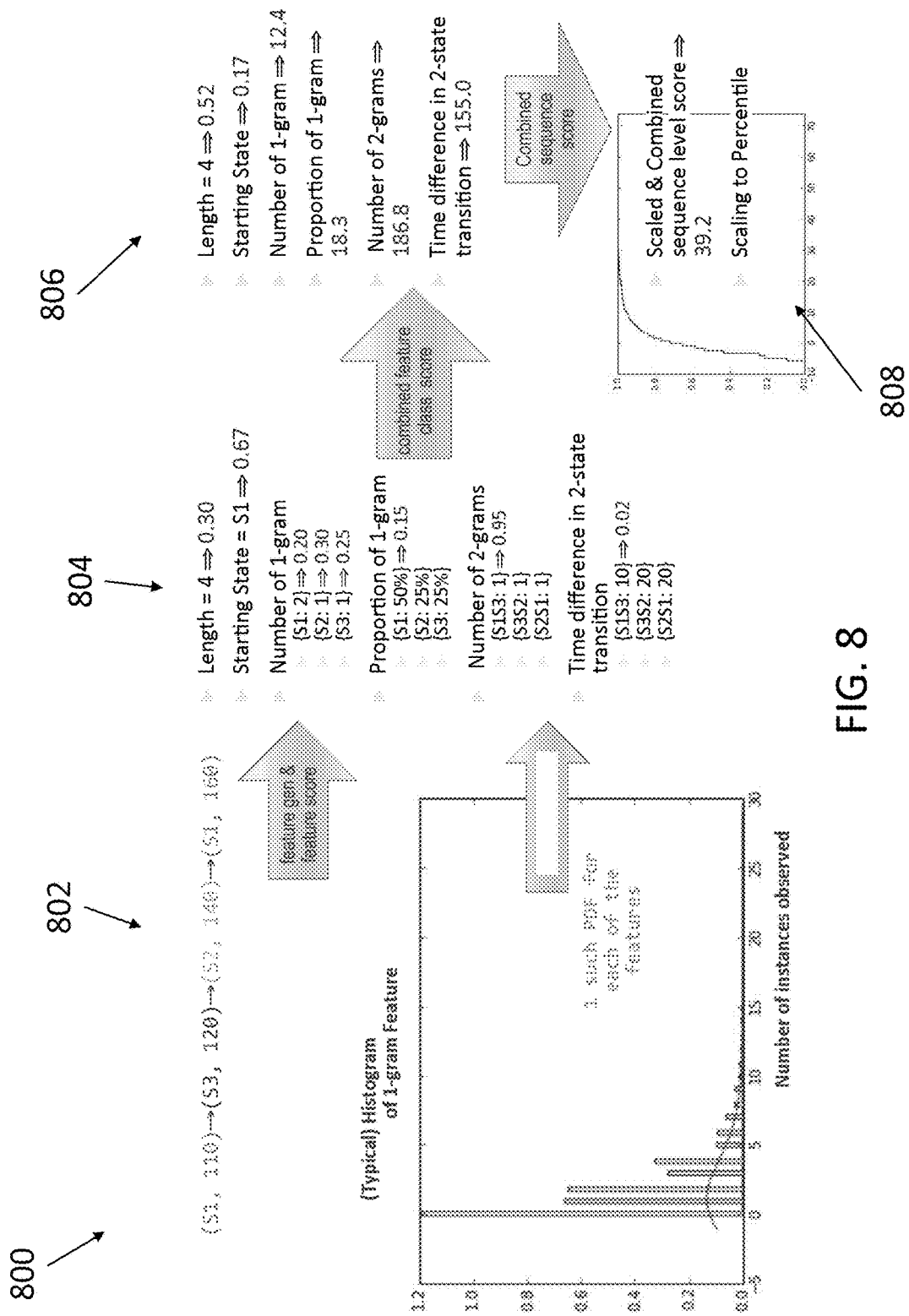
FIG. 8 is an illustration of the process of determining feature scores for the various vector features of a sequence, having one or more elements consistent with the current subject matter; and, FIG. 9 is a diagram illustrating aspects of a system showing features consistent with implementations of the current subject matter.

FIG. 8 is an illustration 800 of the one of the process of determining sequence level anomaly scores using feature scores for the various vector features of a sequence 802. Individual n-gram vector features 804 can be provided a score. The score can be based on estimates of Kernel Density fitted on underlying feature data. Scores may be calibrated to imply high score to unusual and rare instances and low score to usual and common occurrence for that feature. One or more individual vector features can belong to a feature class. Based on the scores of the individual features, a feature class score 806 can be determined. The feature class score may be the sum, product or maximum of individual feature scores for all features in that feature class. The feature class scores can be scaled to provide class scores in similar range and distribution across all classes. One method of doing so may include unit normalization where each individual feature class score is reduced by the mean of scores of that feature class across sequences and divided by the standard deviation of scores of that feature class across sequences and combined to provide a sequence score 808.

In some variations, data instances can be treated as a string and clustered into groups of strings. Clustering as a string can be accomplished using edit-distance as a dissimilarity metric. Different modalities can exist for such a clustering procedure.

In some variations, state transitions can be represented by a multi-order Markov chain. This can be accomplished by determining the likelihood of transitioning from one state to another in one or more steps. Determining the likelihood of transitioning from one state to another can generate representative distributions that allow the identification of rare states. The presently described subject matter provides for efficient determination of multi-step transitions that result in the rare machine states. The overall likelihood for a data instance may be a product of individual transition likelihoods. Lower overall likelihood may be associated with rare occurrence and a higher anomaly score. Anomaly scores can be provided to states of a system. The anomaly scores can be based on the severity of an issue(s) caused by a particular state and/or based on the frequency of a particular state.

At 110 a notification of a sequence of states that tends to result in a rare machine state can be provided. In some variations, actions can be automatically implemented in response to detection of a sequence of states that tends to result in the occurrence of a rare machine state.

Figure 9:
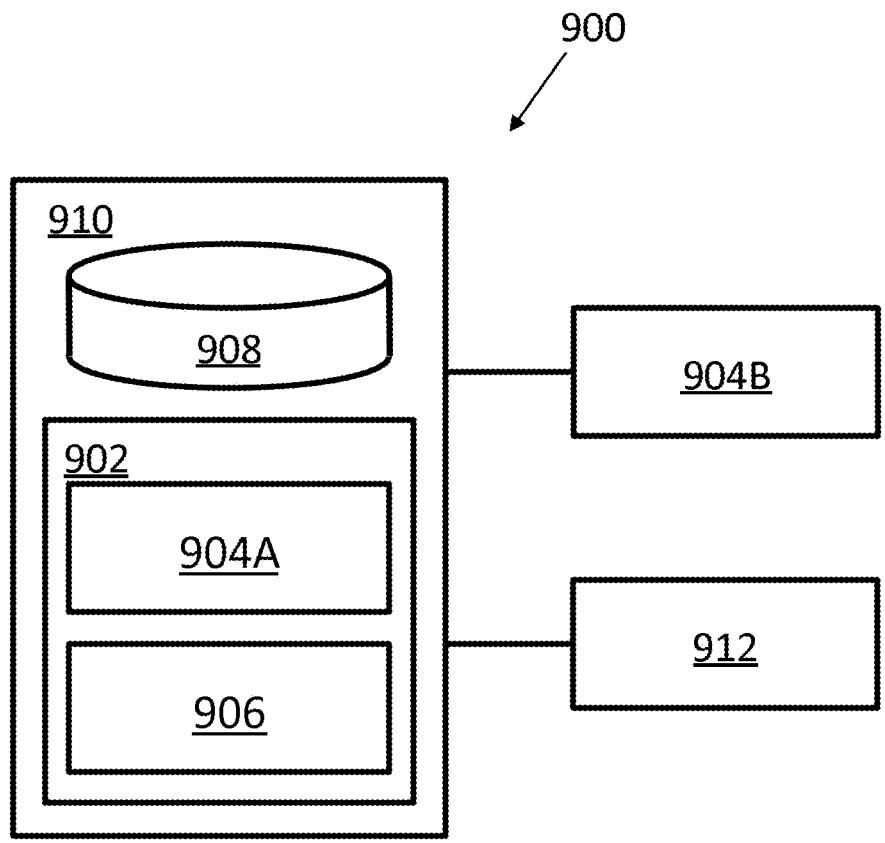

FIG. 9 is a diagram illustrating aspects of a system 900 showing features consistent with implementations of the current subject matter. The system 900 can be a system on which the present current subject operates. A system 900, such as a computer system, may include one or more system components 904A, 904B. The one or more system components 904A, 904B may be hardware components, software components, or a combination of the two. 904A can represent software components. 904B can represent components that are remote from the one or more data processors 902 that are performing the process(es) described herein. The component(s) 1904A, 904B can include sensors providing sensor information.

The one or more system components 904A 904B can have one or more states. The one or more states can change over time. The state(s) of the system components 904A, 904B can be recorded. The state(s) of the system components 904A, 904B can be recorded in accordance with a software program. The state(s) may be recorded as data instances to create sets of data instances associated with a system component 904A, 904B. In some examples, the sets of data instances associated with the states of a system component may be machine logs. States of the system component may be recorded as individual log lines within the machine log. Machine logs may be generated by explicit instructions in source code, being a piece of software that is typically developed by a developer. The source code may be included in a system component 904A to control and/or monitor the system component 904A. Alternatively, or in addition to, the source code 906 may be included in another location in the system 900 but may control and/or monitor the system component.

In some implementations, the system components 904A, 904B may be one or more sensors. The one or more sensors may be configured to obtain data representing one or more conditions external to the sensor(s). The data instances may be a representation of the observed data from the sensor(s).

Each data instance, or log-line, in a set of data instances, or machine log, may be tracked to an output command in the source code controlling and/or monitoring the associated system component. For example, many programming languages use a PRINT, or equivalent statement, to output information. In some examples, each of the data instances may be tracked to the PRINT, or equivalent, command in the source code controlling and/or monitoring the system component.

The state of the system component(s) 904A, 904B at any given time may be recorded in response to a trigger. The trigger may cause sets of data instances to be created and/or augmented with one or more data instances representing a state of the system component(s) 904A, 904B. The trigger may be one or more system component(s) 904A, 904B correctly performing a number of operations in accordance with a software program controlling and/or monitoring the system component(s) 904A, 904B. The trigger may be one or more system component(s) 904A, 904B failing to perform an operation in accordance with a software program controlling and/or monitoring the system component(s) 904A, 904B. A system component may fail to perform an operation by failing to perform the operation at all, failing to perform the operation in an intended sequence, failing to perform the operation within a given period of time. The trigger may be the passage of a period of time. The source code controlling and/or monitoring the one or more system components 904A, 904B may be configured to cause create sets of data instances and/or augment sets of data with data instances representing the state of one or more system components 904A, 904B at predetermined intervals. The trigger may be a change of state of one or more of the system components. The trigger may be a combination of the passage of time and/or a change of state of one or more of the system components 904A, 904B.

The system 900 may comprise one or more electronic storage devices 1108. The one or more electronic storage devices 908 may store the sets of data instances, or machine logs. The source code associated with the controlling and/or monitoring the one or more system components 904A, 904B may be configured to cause data instances associated with the states of the component(s) 904A, 904B to be recorded to the electronic storage devices 908. The electronic storage devices 908 may be located in a computer system 910 or may be located remote from the computer system 906. The presently disclosed method may be performed on one or more computer processors 902. The one or more computer processors 902 may be the computer processor(s) 902 that execute the instructions contained in the source code controlling and/or monitoring the system component(s) 904A, 904B. The computer processor(s) 902 may be separate from the system component(s) 904A, 904B. The presently disclosed method may be executed by the a computer processor(s) 902 in response to the computer processor(s) performing actions as required by one or more computer program components 906.

In some implementations, the computer program configured to cause the processor(s) 902 to perform the method described herein may cause the generation of an output. The output may be generated on one or more components 912 of the system. The output may be generated on a component 912 that is integrated within the system being monitored, or may be external to the system being monitored.

Each data instance can be associated with a state for a component and/or system. Each data instance may be identified with a state. Consequently, a sequence of data instances may be considered as a transition of states. Multiple sequences of data instances may be compared with each other. Seemingly separate data instance sequences may be determined to actually represent the same underlying system state. Knowing which sequences of data instances represent which underlying state may facilitate detecting anomalies, intrusions, security threats, operational inefficiencies, hidden brewing problems, unusual patterns in data sets of data instances, and/or other trends.

Data parsing turns unstructured data into structured tabular data. Having structured data allows for the visualizations of the data to be generated and for analysis to be performed on the data. By clustering the data instances representing state of system components and/or entire systems, parsing of the data may be made more efficient, and a greater impact may be achieved from the same exerted effort.

Identifying states for individual data instances in the manner described herein compresses the data information associated with the data instances without significant loss of information. Consequently, the visualization of data instances may be made easier for reporting or debugging of the component(s) and/or system.

The presently described subject matter can provide the ability to parse large volume of data instances, that include log data, sensor data and/or other data, to monitor systems generating the data instance to preemptively identify potentially anomalous machine states. The presently described subject matter can provide an assessment of the degree of confidence on the assessment of how far away from "normal" the state of the machine will get. This makes machine logs and sensor data not only tool for investigating failure but also for preventing failures or mitigating damages from failures, if they occur. The currently described subject matter can improve the performance of a machine or system, reduce system downtime, suggest operational efficiency improvement opportunities, and feed planning activities into the management of the system.

An example of an advantage provided by the presently described subject matter includes facilitating the prediction of the occurrence an anomalous state in a utility grid, such as an electrical grid, gas grid, and/or other utility grids.

Utility grids include an interconnected network of components for delivering a commonly-used product, such as electricity, gas, water and other commonly-used products. For electricity grids, these components can include power plants, transformers, substations, electrical cabling and other components. Some of these components are themselves clusters of components. All of these components can include systems that generate state information associated with the component. This state information can be aggregated for the entire utility grid or a portion of the utility grid.

Analyzing this state information in the manner prescribed by the currently described subject matter facilitates the determination of likely future states of the utility grid or at least a portion of it. States of components change over time and information relating to these changing states provides a sequence of states for the components. In turn, this information can be used to provide a sequence of states for the entire utility grid or portions thereof. Sequences of states can be identified that tend to lead to problem states for the utility grid. Once those sequences have been identified, solutions are developed to head-off those states once the sequences are detected. Once the solution is implemented, upon identifying the start of a sequence that tends to lead the utility grid to enter a problem state, the solutions can be executed and the potentially devastating problem state for the utility grid can be avoided.

Once sequences of states are identified, those sequences may be seen again and again. Most of the sequences can be innocuous. Occasionally a previously unseen sequence may be detected. An alert can be provided for this new sequence and the state of the utility grid can be more closely monitored until any issue has been identified and/or resolved. The currently described subject matter, therefore, can result in utility grids that run much more efficiently, and also avert potential disastrous outcomes. Especially when dealing with nuclear power generation systems.

The same general operations can apply to any system that comprises multiple components. For example, in a distributed computing system multiple software components can be executed that cause the distributed computing system to perform operations. The software components can have different states at any given point in their execution and implementation. These states can be monitored and sequences of states can be identified. When the distributed computing system experiences a problematic state, the sequence of states that lead up to that problematic state can be noted and analyzed. Solutions can be crafted to head-off the problem from arising when such sequences are detected. By heading off problems before they arise, the distributed computing system can continue performing its designated tasks with much-reduced downtime. Thereby improving the computer system and making the computer system run more efficiently.

While some specific examples are provided to describe the advantages, improvements and efficiencies provided to systems by the presently described subject matter, this subject matter can be applied to any system that comprises components. Especially when those components yield information that can give an indication of their state.

Without in any way limiting the scope, interpretation, or application of the claims appearing herein, a technical effect of one or more of the example embodiments disclosed herein may include providing ways to determine the distribution of state-types across the groups of data instances that represent states of a system or a group of components within a system. From the sequence of groups and/or clusters a list of infrequent state-types can be generated for the system based on the determined distributions of state-types across the groups. State types associated with, and possibly pre-occurring, the infrequent state-types can be determined, thereby allowing for predictions of when the occurrence of infrequent state-types are likely to occur. The occurrence of a frequent state-type may typically represent system-wide errors or serious component errors.

By representing the data instances representing the state(s) of system components and/or entire systems in form of set of underlying states, the presently described operations can allow the data to be parsed more efficiently and allow for a greater impact from the same exerted effort. Additionally, grouping and/or collating the data instances in the manner described can allow determination of future system errors that otherwise would go undetected until a major problem arises. Identifying trends in the data instance sequences yields the ability to predict future events within a component and/or computer system. Identifying these infrequent errors within a voluminous amount of data instances will facilitate the determination of which component and/or system conditions result in major component and/or system errors. Once these conditions have been determined it will be possible to predict future major component and/or system errors and implement actions to avoid such major component and/or system errors and failures.

The presently described subject matter offers one or more non-limiting technical advantages. For example, the current subject matter can provide an automated way of discovering potential unusual system states across huge volumes of machine logs and across a plurality of different formats that machine logs or sensor data are generated in. The current subject matter can also predict potential failures, errors, or other kind of undesirable system operation.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for implementation by one or more data processors forming part of at least one computing device to facilitate detection and avoidance of undesirable system states of a system, the method comprising:
   monitoring, by the one or more data processors, states of the system, the system comprising a plurality of components, the states of the system having state types and determined based on data instances of the plurality of components and/or the system, the data instances comprising machine-log-lines;
   receiving, by the one or more data processors, data instance groups representative of the states of the system, the data instance groups comprising one or more data instances associated with a state of the system and having time information;
   identifying, by the one or more data processors, a representative data instance for each data instance group;
   determining, by the one or more data processors, a sequence of state transitions based on the representative data instances and the time information, wherein each element of the sequence comprises a data instance group identifier and a data instance identifier;
   determining, based on the sequence of state transitions, by the one or more data processors, a distribution of state types within the data instance groups to identify infrequent state types;
   translating, by the one or more data processors, the sequence of state transitions into feature vectors, wherein the feature vectors comprise a first feature vector indicating a starting state of the sequence and a second feature vector indicating a time for the transition between a first state and a second state of the sequence, wherein each feature vector is associated with one or more feature classes;
   calculating, by the one or more data processors, a feature score for each feature vector based on kernel density estimation;
   determining, by the one or more data processors, a feature class score for individual feature classes of the one or more feature classes, the feature class score comprising a sum of feature scores having the same feature class;
   calculating, by the one or more data processors, a sequence anomaly score based on the feature class scores across the sequence of state transitions, the sequence anomaly score indicating a likelihood of a rare state and/or rare sequence;
   identifying, based on sequence anomaly scores, by the one or more data processors, rare states and/or rare sequences, wherein rare sequences include sequences of data instance groups that occur prior to an occurrence of a state having an infrequent state type; and
   providing, by the one or more data processors and in response to identifying the rare states and/or rare sequences, a notification of the occurrence of a rare sequence on the system.

2. The computer-implemented method of claim 1, wherein the feature vectors are represented as strings.

3. The computer-implemented method of claim 1 wherein the feature vectors are represented as numerical values.

4. The computer-implemented method of claim 1, wherein the data instance groups include attribute information associated with the state of a machine.

5. The computer-implemented method of claim 1, wherein translating the sequence of state transitions into feature vectors comprises:
   generating machine-state transition features associated with the sequence of state transitions for inclusion in the feature vectors.

6. The computer-implemented method of claim 5, further comprising:
   assigning feature scores to the machine-state transition features; and,
   combining feature scores of the machine-state transition features having a same feature class.

7. The computer-implemented method of claim 6, further comprising:
   generating a model showing a frequency of occurrence of the combined feature scores for one or more feature classes.

8. The computer-implemented method of claim 7, wherein the model is a graphical illustration.

9. The computer-implemented method of claim 5, further comprising:
   generating a graphical illustration or model showing a frequency of occurrence of the sequence of state transitions.

10. The computer-implemented method of claim 1, wherein the feature vectors include a starting state of the sequence of state transitions.

11. The computer-implemented method of claim 1, wherein the feature vectors include a proportion of a state within a sequence of states.

12. The computer-implemented method of claim 1, wherein the feature vectors include an indication of a time for a transition between a first state and a second state of the sequence of state transitions.

13. The computer-implemented method of claim 1, wherein the feature vectors include an indication of a number of data instance groups required to transition from a first state to a second state.

14. The computer-implemented method of claim 1, where in the data instance groups are generated through a process comprising:
   receiving data sets that include a plurality of data instances representing states of one or more components of a system, the data instances being generated by one or more separate data set sources that are configured to output a data instance in response to a trigger associated with the one or more components and having associated time information;
   normalizing the data instances of the data sets by applying one or more rules to the data instances; and,
   separately collating the data instances of the data sets from individual data set sources across individual time elements to generate groups of time-element-specific collated data instances.

15. The computer-implemented method of claim 14, wherein normalizing the data instances of the data sets comprises:
   determining a relationship between observed states and unobserved states of the system.

16. The computer-implemented method of claim 14, wherein the data instance groups include data instances representative of machine-log-lines.

17. The computer-implemented method of claim 14, wherein the data sets include machine logs and the data instances include machine-log-lines.

18. The computer-implemented method of claim 1, wherein the sequence anomaly score is based on the severity of an issue caused by a particular state and/or based on the frequency of a particular state.

19. A system capable of detecting anomalous states of the system, comprising:
- at least one programmable processor; and,
- a non-transitory storage medium readable by at the least one processor and storing instructions which, when executed by the at least one programmable processor, implement operations comprising:
  - monitoring states of a machine comprising a plurality of components, the states of the machine having state types and determined based on data instances of the plurality of components and/or the system, the data instances comprising machine-log-lines;
  - receiving data instance groups representative of the states of the system, the data instance groups comprising one or more data instances associated with a state of the system and having time information;
  - identifying a representative data instance for a data instance group;
  - determining a sequence of state transitions based on the representative data instances and the time information, wherein an element of the sequence comprises a data instance group identifier and a data instance identifier;
  - determining, based on the sequence of state transitions, a distribution of state types within the data instance groups to identify infrequent state types;
  - translating the sequence of state transitions into feature vectors, wherein the feature vectors comprise a first feature vector indicating a starting state of the sequence and a second feature vector indicating a time for the transition between a first state and a second state of the sequence, wherein a feature vector is associated with one or more feature classes;
  - calculating a feature score for the feature vector based on kernel density estimation;
  - determining a feature class score for individual feature classes of the one or more feature classes, the feature class score comprising a sum of feature scores having the same feature class;
  - calculating a sequence anomaly score based on the feature class scores across the sequence of state transitions, the sequence anomaly score indicating a likelihood of a rare state and/or rare sequence;
  - identifying, based on sequence anomaly scores, rare states and/or rare sequences, wherein rare sequences include sequences of data instance groups that occur prior to an occurrence of a state having an infrequent state type; and
  - providing, in response to identifying the rare states and/or rare sequences, a notification of the occurrence of a rare sequence on the machine.

* * * * *